United States Patent Office 2,940,943
Patented June 14, 1960

2,940,943
RESINOUS COATING COMPOSITION COMPRISING NITROCELLULOSE AND ALDEHYDE MODIFIED AMIDE POLYMER AND METALLIC SURFACE COATED THEREWITH

Roger M. Christenson and Henry A. Vogel, Richland Township, Allegheny County, Pa., assignors to Pittsburgh Plate Glass Company, Allegheny County, Pa., a corporation of Pennsylvania No Drawing. Filed Feb. 25, 1957, Ser. No. 641,871

11 Claims. (Cl. 260—15)

This invention relates to useful resinous materials and it pertains more particularly to resinous materials which are useful as film forming agents in coating compositions.

In a copending application, Serial Number 584,473, filed May 14, 1956, now abandoned, which is a continuation-in-part of Serial Number 490,409, filed February 24, 1955, now abandoned, it is disclosed that useful resinous materials are readily obtained by reacting an aldehyde, particularly formaldehyde with an interpolymer of acrylamide and one or more polymerizable ethylenically unsaturated monomers, particularly monomers containing a >C=CH₂ group. The resulting resins range from soft flexible materials to very hard, solids, depending upon the choice of monomers utilized in preparing the acrylamide interpolymer employed in the reaction and upon other conditions involved in the reaction.

It has now been discovered that these resins are highly compatible with nitrocellulose, and when the latter is added in appropriate amount to mixtures of the resins in solvents, homogeneous solutions are formed. These solutions when spread as films and set or dried, provide surfaces of high gloss. Also the films obtained by use of the nitrocellulose in the aldehyde modified acrylamide resin are characterized by a relatively high degree of flexibility and good adherence to the substrate. These are characteristics adapting the material for many applications, as for example in the finishing of sheet metal toys, furniture, or interior paneling or other articles of metal and the like where high gloss and high mar resistance are desirable properties.

As previously indicated, the present invention has particular relation to the use of nitrocellulose to modify acrylamide resins and their interpolymers which have been reacted with an aldehyde and more particularly with formaldehyde.

The exact mechanism whereby the amide interpolymers, constituting components of the materials of this invention are obtained is not definitely known but is believed to begin by the formation initially of the relatively short chain soluble interpolymer, having approximately the following structure:

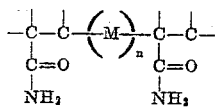

where M represents a unit of monomer polymerizable with acrylamide and n represents a whole number greater than 1. For example, if styrene is utilized as a second monomer, M would possess the structure:

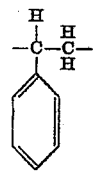

Group M need not necessarily all be identical, since a mixture of two or more monomers may be reacted with the acrylamide to obtain macromolecules and mixtures of macromolecules in which the symbol M represents a plurality of different groups.

The short chain interpolymer is reacted with an aldehyde as represented by formaldehyde to form N-methylol groups, thus to give the structure:

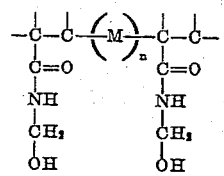

where M and n have the significance already set forth. In the event that formaldehyde is utilized in the form of a solution in butanol or other alkanol, etherification may take place so that at least some of the methylol groups in the above structure are converted to groups of the structure:

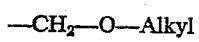

—CH₂—O—Alkyl the alkyl group being derived from the hydrocarbon portion of the alkanol utilized. The amount of etherification taking place depends in large measure upon the pH value of the reaction mixture, the etherification being favored by acidic reaction conditions.

Among the monomers which may be interpolymerized with acrylamide are included methyl acrylate, butyl acrylate, isobutyl acrylate, hexyl acrylate, octyl acrylate, methyl methacrylate, ethyl methacrylate, butyl methacrylate, styrene, vinyl toluene, dibutyl maleate, acrylic acid, methacrylic acid, maleic anhydride, vinyl ethers, vinyl ketones, vinyl pyridine, allyl acetoacetate, glycidyl acrylate, methacrylamide, dimethyl benzyl methacrylate, vinyl esters and the like. Mixtures of two or more of these monomers are included within the purview of the invention. Some of the interpolymers for use in forming the coating compositions of this invention are three component, interpolymers of (1) acrylamide, (2) an alkyl acrylate in which the alkyl group contains from one to four carbon atoms and particularly ethyl acrylate, and (3) styrene and vinyl toluene or an alkyl ester of methacrylic acid in which the alkyl group contains from 1 to 4 carbon atoms and particularly methyl methacrylate. By choice of monomers, it is possible to tailor the interpolymer to have any desired degree of hardness or flexibility. It has also been found that a small quantity of an acid monomer, such as acrylic acid, methacrylic acid, crotonic acid, maleic acid, or fumaric acid may be incorporated as an internal catalyst designed to impart to the coating compositions desirable fast curing properties. In the preparation of the coating compositions of this invention, the acrylamide component may be replaced by methacrylamide, itaconate diamide, or other polymerizable acrylamide. Other useful compositions have been based on major amounts of ethyl acrylate and minor amounts of acrylamide. Such compositions may be regarded as resinous polymeric plasticizers for nitrocellulose.

Interpolymers of acrylamide and added monomers which can be reacted with an aldehyde to form interpolymers which can be modified with nitrocellulose in accordance with the provisions of the present invention, are most readily prepared by conducting the polymerization in a solvent in which the acrylamide (a white crystalline solid at room temperature) and the other monomer or monomers are soluble at least at reaction temperatures.

Butanol has proven to be a satisfactory solvent in most cases. Isopropyl alcohol, butyl Cellosolve and mixtures of butanol or other lower alkanol with water can also be used advantageously as solvents. Some care must be exercised when water is present in the system, as gummy precipitates may result, especially at higher water levels. The presence of lower alcohols or water has been found to moderate the speed of reaction by lowering the reflux temperature. Butyl or ethyl acetate, or other ester solvents and hydrocarbons, such as xylene and the like, may also be employed.

In conducting the polymerization reaction, a peroxygen type catalyst is ordinarily utilized. Useful catalysts for this purpose include acetyl benzoyl peroxide, hydroxy heptyl peroxide, methyl ethyl ketone peroxide, cyclohexanone peroxide, cyclohexyl hydroperoxide, 2,4-di-(chlorobenzoyl)peroxide, cumene hydroperoxide, t-butyl hydroperoxide, methyl amyl ketone peroxide, acetyl peroxide, lauryl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like.

Cumene hydroperoxide and benzoyl peroxide are presently among the more economical of these and are in most instances, entirely satisfactory as catalyst. Cumene hydroperoxide is preferable at higher reflux temperatures whereas the benzoyl peroxide is very effective at lower reflux temperatures. For some polymerization reactions, mixtures of two or more of the foregoing peroxygen compounds may be employed to secure the desired conversion.

The diazo compounds such as p-methoxyphenyl diazo thio-(2-naphthyl)-ether, as well as the so-called redox catalyst systems may also be used as polymerization catalysts in the preparation of the acrylamide interpolymers.

The quantity of catalyst employed can be varied considerably dependent upon the speed of reaction desired, the activity of the catalyst and of the monomer employed, as well as other factors. In most instances, however, it is desirable to utilize from about 0.1 percent to 2.0 percent by weight based upon the interpolymerizable mixture. If high viscosities are desired in the interpolymer a low initial level of catalyst followed by the necessary additions to obtain desired conversion of the mixture to an interpolymer is preferably employed. For low viscosity interpolymers, the bulk of the catalyst is added initially and later additions are incorporated only to secure the desired degree of conversion. The incorporation of larger amounts of catalyst into the initial mixture results in products of lower viscosity.

It is desirable that the interpolymers of acrylamide and other ethylenically unsaturated monomers be of relatively low molecular weight so that they can be dissolved to obtain solutions of high solids content, but of relatively low viscosity. Although the molecular weight can be reduced to some extent by the use of a lower alkanol, such as butanol, or a mixture of butanol and water as a reaction solvent coupled with the use of high catalyst levels, it is often preferable to add to the reaction mixture controlled amounts of chain modifying materials. The mercaptans, such as dodecyl mercaptan, tertiary dodecyl mercaptan octyl mercaptan, hexyl mercaptan and the like are conventionally employed for this purpose. However, still other chain modifying agents, such as cyclopentadiene, allyl acetate, allyl carbamate, alpha-methyl styrene and its dimers, unsaturated fatty acids or esters thereof and the like can also be added in controlled amounts to secure interpolymers of low molecular weight. The elimination of chain modifying agents from the interpolymerizable mixtures results in higher viscosity interpolymers which tend to possess valuable properties from the standpoint of fabrication.

The polymerization is preferably conducted by thoroughly and rapidly agitating the acrylamide, or other polymerizable amide and the other monomer or monomers, the catalyst, the chain modifying agent (if any) in the solvent and refluxing the resultant solution for a time sufficient to obtain the desired conversion. The polymerization will be completed in a period of about one to sixteen hours. As previously indicated, it may in some instances, be desirable initially to add only a portion of the catalyst, the remainder being added in increments as the polymerization progresses. External cooling of the polymerization mixture to obtain control of reflux conditions is often desirable because of the rapid rate of reaction and because the reaction is quite exothermic. Control of the heat of reaction is also at least partially obtained by adding the acrylamide to the polymerization mixture incrementally.

In the polymers obtained by the foregoing methods, the components are distributed at random in the chain. It will be apparent that so-called "block" or "graft" techniques may also be employed in conducting the polymerization. By block or graft methods, the components may be introduced into the composition in regular sequence or order, each segment being of a certain length and periodicity. These products can be made so that the acrylamide portion is in fixed position in the chain. This approach involves the preparation of segments which react in groups or in sites along the preformed back-bone, from which or to which other segments can be grown or attached. By the block or graft method, one can prepare by choice materials of different solvent and flame resistance, adhesion and solvent, or water solubility. In fact, almost any desired property can be "tailored" into the interpolymer.

Interpolymers prepared by the foregoing techniques, as for example by random polymerization grouping, or by block or graft methods are suitable for interaction with formaldehyde or other aldehyde in order to obtain resins which may be added to, or receive additions of nitrocellulose in accordance with the provisions of this invention.

In conducting the reaction with aldehyde, formaldehyde in water solution or in a lower alcohol, such as butanol, may be employed. Likewise, formaldehyde yielding substances such as paraformaldehyde, trioxymethylene or hexamethylenetetraamine may be employed and often are preferred. It will be appreciated that still other aldehydes including acetaldehyde, butyraldehyde furfural and others which preferably contain only atoms of carbon, hydrogen and oxygen may be used.

Interpolymers suitable for reaction with the aldehyde component contain from about 5 percent to about 45 percent by weight of acrylamide, the balance being other ethylenically unsaturated monomers. It has been found that those interpolymers containing the higher levels of acrylamide with those monomers which ordinarily form hard homopolymers, when reacted with formaldehyde give hard and flexible films, whereas interpolymers containing lower levels of acrylamides with those monomers which ordinarily form soft homopolymers form products that tend to be considerably softer. If more than one ethylenically unsaturated monomer is polymerized with acrylamide, the proportion of such additional monomers utilized will depend upon the characteristics which such monomer or monomers will impart to the final interpolymer and the degree in which such characteristics are desired:

For example, in some ternary interpolymer systems, it may be desirable to utilize about 10–15 percent by weight of acrylamide and about 40–45 percent of each of 2 additional monomers, such as styrene, and ethyl acrylate. In some instances, such as when acrylic acid or other ethylenically unsaturated acid is utilized as an internal catalyst, it is desirable that the interpolymer contain about 10–15 percent of acrylamide, a total of about 75 percent to 88 percent of 2 additional ethylenically unsaturated monomers and about 1.0 percent to about 8.0 percent of unsaturated acids. The amount of monomers necessary in any interpolymerization reaction suitable to tailor the product to meet specific requirements can readily be determined by simple experiment.

In the reaction of an interpolymer with formaldehyde it is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered if desired. For example, the ratio may be as high as about 3 equivalents, or as low as about 0.2 equivalent of formaldehyde for each amide group in the interpolymer.

The reaction preferably is conducted in the presence of a mild acid catalyst such as maleic anhydride. Other acid catalysts such as oxalic acid, hydrochloric acid or sulfuric acid may also be used although there is some possibility of gelation occurring if the catalyst is too strongly acidic. Alkaline catalysts such as sodium hydroxide, potassium hydroxide, hexamethylenetetraamine and other basic amines may also be utilized and in fact there is evidence to indicate that the use of the basic catalyst tends to give faster curing resin films.

In the reaction of the aldehyde with the interpolymer, catalysts may be dispensed with entirely, but usually the reaction under such conditions, is less satisfactory than where a catalyst is employed.

The quantity of catalysts utilized may be varied widely; for example, as pointed out hereinbefore, if an alcohol solution of formaldehyde is employed, the more acidic the reaction medium, the greater the amount of etherification which will occur. If the aldehyde is used in the form of an alcoholic solution, it is preferred to utilize from about 0.2 percent to 3.0 percent by weight of catalyst based upon the weight of acrylamide interpolymer which is reacted with the aldehyde.

The reaction of the acrylamide interpolymer with the aldehyde can be conducted simply by adding the aldehyde and the catalyst (if catalyst is utilized) to the polymerization mixture obtained by polymerizing acrylamide and one or more ethylenically unsaturated monomers and refluxing the resulting mixture for a period of about 3 to 5 hours or until desired viscosity is obtained.

The water of condensation can be removed by azeotropic distillation, as may a portion of the solvent if so desired. In fact, when the aldehyde is utilized in the form of a solution in an alkanol such as butanol, it is often desirable that approximately half of the butanol be distilled off at the end of the reaction period and be replaced by another solvent such as xylol. It is preferred that the final resinous material have a solids content of about 20 percent to 75 percent by weight.

Similar polymeric materials may also be obtained by first reacting the acrylamide with an aldehyde such as formaldehyde to form an alkylol acrylamide, for example methylol acrylamide, and then polymerizing the product with one or more of the ethylenically unsaturated monomeric materials disclosed hereinbefore. The polymerization utilizing methylol acrylamide is carried out substantially in the same manner as when acrylamide is interpolymerized with one or more monomers.

Regardless of the method by which the resinous material is obtained, the products are characterized by the presence of recurring groups of the structure:

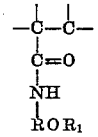

wherein R is a lower aliphatic hydrocarbon radical, that is the radical derived by removing oxygen from a lower aliphatic aldehyde; for example, if formaldehyde is used, the radical R represents a methylene group $(CH_2)$.

When an alcoholic solution of the aldehyde, for example, a butanol solution of formaldehyde is employed, etherification may take place and at least a portion of the alcohol is so reacted into the polymer chain that at least some of the radicals $R_1$ will be represented by a lower alkyl radical such as butyl while any that are not alkyl are hydrogen.

When the aldehyde is used alone, that is in the absence of an alcohol, the radical $R_1$, of course, will represent hydrogen. The free valences may be satisfied with either hydrogen or hydrocarbon depending upon the amide which is utilized.

The following examples are illustrative of the preparation of an acrylamide interpolymer and the subsequent reaction of the same with formaldehyde to provide a resin which is compatible with nitrocellulose over a wide range of proportions:

*Example A*

In this example, an interpolymerizable mixture was prepared comprising:

| | |
|---|---|
| Acrylamide _____ pounds __ | 3 |
| Styrene _____ do ____ | 5 |
| Ethyl acrylate _____ do ____ | 12 |
| Butanol _____ do ____ | 20 |
| t-Dodecyl mercaptan _____ grams __ | 90.8 |
| Cumene hydroperoxide _____ do ____ | 90.8 |

This mixture was placed in a reaction vessel under a reflux condenser. The mixture was refluxed for 2 hours after which 45.4 grams of cumene hydroperoxide was added and refluxing was continued for an additional 2 hours after which an additional 45.4 grams of cumene hydroperoxide was added and the mixture was refluxed for a final 2 hour period.

The resultant product was an interpolymer solution which was adapted for reaction with formaldehyde or a substance yielding formaldehyde. In this particular example, a solution of formaldehyde in normal butyl alcohol, known as butyl Formcel was employed. This was understood to comprise 40 percent formaldehyde and 51.5 percent butyl alcohol, the rest being water.

The reaction mixture comprised:

| | |
|---|---|
| Interpolymer solution (as above described) _____ | The foregoing. |
| Formaldehyde solution _____ | 6.34 pounds. |
| Maleic anhydride _____ | 36.3 grams. |

The ratio of formaldehyde to the acrylamide component of the resin was approximately two moles of the former to one mole of the latter.

The resultant mixture was refluxed for 3 hours. During this time, water was decanted from the condensate. Subsequently, the mixture was azeotropically refluxed for 2 more hours. The product obtained was of a solids content of 51 percent and of a viscosity of X upon the Gardner-Holdt scale. The resin was termed resin A.

This product was highly compatible with nitrocellulose. The mixtures of nitrocellulose and the resin could be employed for coating wood, metal, stone or the like, for example in interior or exterior applications.

The solution may be applied with or without pigmentation as may be required. The mixtures of the resin and nitrocellulose may be applied to primed or unprimed surfaces as may be desired.

Example B

In accordance with this example, an interpolymer was prepared from acrylamide, methyl methacrylate and ethyl acrylate. The charge comprised:

| | | |
|---|---|---|
| Acrylamide | pounds | 3 |
| Methyl methacrylate | do | 5 |
| Ethyl acrylate | do | 12 |
| Butanol | do | 20 |
| t-Dodecyl mercaptan | grams | 90.8 |
| Cumene hydroperoxide | do | 90.8 |

This mixture was placed in a reaction vessel under a reflux condenser and was refluxed for 4 hours to provide an interpolymer which was suitable for further reaction with formaldehyde to provide a resin adapted for modification with nitrocellulose in accordance with the provisions of the present invention. To this end, there was added 6.34 pounds of a solution of formaldehyde in butanol and being of the composition described in Example A and 36.3 grams of maleic anhydride. The mixture was refluxed for 3 hours, after which, it was azeotropically refluxed for an additional 2 hours. The resultant product was of high compatibility with nitrocellulose and compositions of the same with the latter material were useful for coating wood, steel and similar materials. The product was of a solids content of 49.3 percent by weight and of a viscosity of Y to Z on the Gardner-Holdt scale. The resin was termed resin B.

The following examples illustrate the preparation of pigmented blends of (a) the resins of Examples A and B and (b) nitrocellulose. In the examples, I and II, a series of blends which differed from each other in the nitrocellulose content were prepared:

Example I

The resin was the same as that of Example A. The compositions of the vehicles of the series in percentages by weight were as follows:

| Nitrocellulose[1] | Resin A | Dioctyl-phthalate |
|---|---|---|
| 10.0 | 80.0 | 10.0 |
| 10.0 | 70.0 | 20.0 |
| 15.0 | 72.5 | 12.5 |
| 25.0 | 70.0 | 5.0 |
| 25.0 | 62.5 | 12.5 |
| 20.0 | 60.0 | 20.0 |
| 20.0 | 55.0 | 25.0 |
| 35.0 | 50.0 | 15.0 |

[1] The nitrocellulose was ½ second, but could be replaced by nitrocellulose of other viscosity.

The foregoing mixtures were pigmented with rutile titanium dioxide in a ratio of 24 pounds per 100 pounds of vehicle.

Solvents were also included in order to promote dispersion and to provide a sprayable mixture. The composition of the solvent system was as follows:

| | Percent by weight |
|---|---|
| Butyl acetate | 4 |
| Butanol | 0.3 |
| Methyl ethyl ketone | 1.0 |
| Denatured alcohol | 5.3 |
| Toluol | 36.9 |
| Acetone | 10.6 |
| Methyl isobutyl ketone | 2.1 |
| Acetate of monoethyl ether of ethylene glycol | 12.8 |

Solvents were added until a total solids content was about 35 percent by weight. The nitrocellulose was highly compatible with the mixtures. The compositions were applied to sheet steel test panels one set of which were bare or unprimed. The panels of the second set were primed with a primer such as is conventionally employed under nitrocellulose lacquers namely, one comprising an alkyd resin or an alkyd resin modified by means of urea resin.

The films were cured by baking at 175° F. to 250° F. until a hard, resinous state was attained, or for about 30 minutes. The temperature, however, was below that of decomposition of the nitrocellulose. Some of the panels were subjected to tests for Sward hardness. They were also bent about a mandrel to determine flexibility and were further subjected to the Ericsen bump test. Some were also given exterior exposure in Florida for 4 months. The results are as follows:

STYRENE-ACRYLAMIDE COPOLYMER

| Composition in Grams N.C.-Resin-DOP | | | Sward (Bare) | Bump (Bare) | Bend (Bare) | Sward (Primed) | Bump (Primed) | Bend (Primed) | Fla. Exposure 4 months, Gloss |
|---|---|---|---|---|---|---|---|---|---|
| 35 | 50 | 15 | 32 | ---- | Fair+ | 28 | 6 | Very good | 90 |
| 25 | 70 | 5 | 40 | ---- | Good | 36 | ---- | do | 90 |
| 25 | 62.5 | 12.5 | 30 | 27 | Very good | 28 | 9 | Good+ | 85 |
| 20 | 60 | 20 | 14 | 27 | Excellent | 18 | 25 | Excellent | ---- |
| 15 | 72.5 | 12.5 | 18 | 27 | do | 20 | 26 | do | ---- |
| 10 | 80 | 10 | 16 | 31 | do | 16 | 27 | do | ---- |
| 20 | 55 | 25 | 10 | 27 | do | 12 | 26 | do | ---- |

Note.—N.C.=nitrocellulose. DOP=dioctyl phthalate. Gloss by Gardner gloss meter.

It will be observed that many of the films exhibited good adhesion, good hardness and good flexibility. The gloss was high initially and remained at 85 or 90 as determined by the Gardner gloss meter even after 4 months' exposure in Florida. Sward hardnesses of 20 or above in this type of resin are regarded as satisfactory as are bump tests of 10 or above. The materials could be used to coat metal furniture, as an automotive lacquer and for many other applications, such as sheet steel desks, cabinets, shelving, toys, etc.

Example II

The resin in this example was B of Example B. This resin was substituted for resin A in the several tests of Example I. The solvent system was substantially the same as in Example I, the nitrocellulose was quite compatible in the mixtures. The mixtures were used to spray coat steel panels, the films when cured were of good gloss, good hardness, good adhesion and good flexibility.

The comments with respect to the tests of Example I apply with respect to this example. These materials could be employed as an automotive lacquer, for industrial finishes, to coat sheet steel furniture, paneling and the like. The results are tabulated as follows:

METHYL METHACRYLATE-ACRYLAMIDE COPOLYMER

| Composition, Grams | | | Sward (Bare) | Bump (Bare) | Bend (Bare) | Sward (Primed) | Bump (Primed) | Bend (Primed) | Fla. Exposure 4 months, Gloss |
|---|---|---|---|---|---|---|---|---|---|
| N.C. | Resin | DOP | | | | | | | |
| 35 | 50 | 15 | 34 | 9 | | 26 | | Fair | 90 |
| 20 | 55 | 25 | 18 | 25 | Excellent | 14 | 23 | Excellent | |
| 20 | 60 | 20 | 18 | 26 | ...do... | 16 | 25 | ...do... | |
| 25 | 70 | 5 | 40 | | | 34 | | Good | 90 |
| 25 | 62 | 12.5 | 28 | 26 | Good | 28 | | ...do... | 85 |
| 15 | 75 | 12.5 | 18 | 27 | Excellent | 18 | 28 | Excellent | |
| 10 | 80 | 10 | 16 | 28 | ...do... | 16 | 28 | ...do... | |
| 10 | 70 | 20 | 8 | 28 | ...do... | 10 | 30 | ...do... | |

*Example III*

In some instances, it may be desirable to incorporate a small amount of an acid into the blend of the resins A, B, C or D whereby to increase the rate of cure, the adhesion to metals or other desirable properties of the material. The following tests illustrate the addition of such acid components. In each instance, the resin was resin B of Example B; the nitrocellulose was ½ second material; dioctyl phthalate was employed as a plasticizer. The composition comprised:

| | Percent by weight |
|---|---|
| Nitrocellulose | 25.0 |
| Resin (per Example B) | 62.5 |
| Dioctyl phthalate | 12.5 |

To this mixture was added 0.5 percent by weight of phosphoric acid, pigment, and solvent as in Example I to provide coating composition of 35 percent total solids. This was sprayed upon sheet steel panels. The films when cured at 175° F.–250° F. for about 30 minutes, had good adhesion, good flexibility and good gloss.
The results of the tests are tabulated as follows:

| | Unprimed | Primed |
|---|---|---|
| Sward hardness | 30 | 26. |
| Ericsen bump test | 26 | 23. |
| Bend | Excellent | Excellent. |

The panels were of high gloss and withstood exposure to moisture for 72 hours without blistering. The material could be used to coat articles of sheet steel.

The following additional samples of similar solids composition and solvent content but characterized by the use of 0.1 percent by weight of the mixture of different acid components were prepared, applied to steel test panels and tested:

| Acid | Sward, Unprimed | Sward, Primed | Bump, Unprimed |
|---|---|---|---|
| monochloro maleic anhydride | 26 | 24 | 24 |
| maleic anhydride | 26 | 24 | 27 |
| phosphoric | 30 | 24 | 27 |
| hypophosphorous | 30 | 24 | 28 |
| phthalic anhydride | 22 | 22 | 27 |

*Example IV*

An interpolymer was prepared comprising as its essential components:

| | Parts by weight |
|---|---|
| Acrylamide | 5 |
| Ethyl acrylate | 95 |

The mixture was refluxed, for example as in Example A with a peroxygen catalyst to form a liquid interpolymer. The interpolymer was then further refluxed with formaldehyde in butanol in a ratio of about 2 moles formaldehyde per mole of acrylamide as in Example A, to effect cross-linking. The resultant resin at a concentration of 46.5 percent by weight in butanol had a viscosity of about H on the Gardner-Holdt scale, the resin was termed resin C.

A pigmented paste of this resin was made up as follows:

| | Grams |
|---|---|
| Titanium dioxide | 496 |
| Phthalocyanine (tint) | 4 |
| Resin solution (46.5% solids) | 280 |

A solution of nitrocellulose was also made up comprising:

| | |
|---|---|
| Nitrocellulose (½ second) | 273 |
| Ethyl alcohol | 65 |
| Butyl acetate | 91 |
| Isopropyl acetate | 180 |
| Toluene | 155 |

The paste and the nitrocellulose solution were then further blended with added resin solution to form a series of coating materials of the following composition:

| | Paste, Grams | Nitrocellulose (solution) grams | Resin (C) (solution) grams | Final Vehicle Composition | |
|---|---|---|---|---|---|
| | | | | Percent N.C. | Resin |
| A | 78.2 | 90.0 | 230.0 | 20 | 80 |
| B | 78.2 | 135.0 | 197.3 | 30 | 70 |
| C | 78.2 | 180.0 | 165.0 | 40 | 60 |
| D | 78.2 | 225.0 | 133.0 | 50 | 50 |

The nitrocellulose and the resin were compatible in the solution. Panels of steel were coated with the mixtures to obtain films which when cured at 180° F. for 30 minutes adhered to the metal and were hard but flexible.

The Sward hardnesses of the various mixtures were 22 for C and 26 for D. The D composition was exposed against commercial automotive lacquer based on nitrocellulose and conventional plasticizer. After 4 months in Florida the experimental material had a gloss of 85 compared to 70 for the conventional lacquer. The improvement in favor of the new material was substantial.

*Example V*

The acrylamide resin of this example comprised:

| | Percent by weight |
|---|---|
| Acrylamide | 10 |
| Ethyl acrylate | 90 |

These were refluxed in butanol until a soluble interpolymer was formed. The butanol solution was then further refluxed with 2 moles of formaldehyde per mole of acrylamide to provide a cross-linked interpolymer which at a solids content of 47.3 percent by weight in butanol, had a viscosity of O on the Gardner-Holdt scale. The resin was pigmented as follows:

| | Grams |
|---|---|
| Titanium dioxide | 496 |
| Phthalocyanine (tint) | 4 |
| Resin solution | 275 |

The pigmented paste was then incorporated with added resin solution and nitrocellulose solution to provide the following coating compositions:

| Sample | Paste, Grams | Nitrocellulose, Grams | Resin solution, Grams |
|---|---|---|---|
| A | 77.5 | 90.0 | 226.0 |
| B | 77.5 | 135.0 | 194.0 |
| C | 77.5 | 180.0 | 163.0 |
| D | 77.5 | 225.0 | 131.0 |

These compositions were useful to coat steel, iron and the like. They could be applied to steel furniture, automobiles and various items, to decorate the same. The Sward hardnesses were 8 for A, 20 for B, 20 for C and 18 for D. When the D composition was exposed in Florida for 4 months its gloss was 90 compared to 70 for a commercial automotive lacquer based on nitrocellulose and a conventional plasticizer. It was substantially better than the latter as to gloss.

The invention contemplates the addition of various compatible plasticizers to the mixture of the resins and the nitrocellulose of the examples. These plasticizers comprise phthalate esters quite generally, epoxidized oils such as epoxidized soya oil, alkyd resins which are plasticizers, epoxy resins which are plasticizers, and others.

The blends of the resins of the examples and nitrocellulose may also be further blended with other resins and plastics such as epoxy resins, melamine resins, urea resins, alkyd resins, phenolic resins and the like.

We claim:

1. A resinous composition comprising a blend of nitrocellulose and an interpolymer of an amide selected from the group consisting of acrylamide, methacrylamide and itaconic diamide, and at least one other monomer containing a $>C=CH_2$ group, said interpolymer containing from about 5 to 45 percent by weight of said amide in polymerized form based on the total weight of said interpolymer and being characterized by having at least one hydrogen atom of an amido nitrogen replaced by the structure

wherein R is a member selected from the group consisting of hydrogen, furyl and lower alkyl and $R_1$ is a member selected from the group consisting of hydrogen, lower alkyl and butoxyethyl, said nitrocellulose and said interpolymer being present in the relative percentages by weight of from 10 to 50 percent nitrocellulose and 80 to 50 percent of said interpolymer.

2. The resinous composition of claim 1 wherein the nitrocellulose is of the viscosity of approximately ½ second.

3. The resinous composition of claim 1 wherein the interpolymer is an interpolymer of styrene, ethyl acrylate and acrylamide.

4. The resinous composition of claim 1 wherein the interpolymer is a copolymer of styrene and acrylamide.

5. The resinous composition of claim 1 wherein the interpolymer is an interpolymer of styrene, ethyl acrylate, acrylamide, and an unsaturated carboxylic acid.

6. An article having a metallic surface having as a coating thereon a film of the resinous composition of claim 1.

7. The resinous composition of claim 1 wherein the structure

is present in an amount of from about 0.2 to about 3 equivalents for each amide group of said interpolymer.

8. The resinous composition of claim 1 wherein R and $R_1$ are each hydrogen atoms.

9. The resinous composition of claim 7, wherein R and $R_1$ are each hydrogen atoms.

10. A resinous composition comprising a blend of nitrocellulose and an interpolymer of acrylamide and at least one other monomer having a $>C=CH_2$ group, said interpolymer containing from about 5 to 45 percent by weight of said acrylamide in polymerized form based on the total weight of the interpolymer and being characterized by having at least one hydrogen atom of an amido nitrogen replaced by the structure $—CH_2OH$ and said nitrocellulose and said interpolymer being present in the relative percentages by weight of from 10 to 50 percent nitrocellulose to 80 to 50 percent of said interpolymer.

11. A resinous composition comprising a blend of nitrocellulose and an interpolymer of acrylamide and at least one other monomer having a $>C=CH_2$ group, said interpolymer containing from about 5 to 45 percent by weight of said acrylamide in polymerized form based on the total weight of the interpolymer and being characterized by having at least one hydrogen atom of an amido nitrogen replaced by the structure $$—CH_2—CH_2O—CH_2CH_2CH_2CH_3$$

and said nitrocellulose and said interpolymer being present in the relative percentages by weight of from 10 to 50 percent nitrocellulose to 80 to 50 percent of said interpolymer.

References Cited in the file of this patent

UNITED STATES PATENTS

| | | |
|---|---|---|
| 1,986,854 | Reid | Jan. 8, 1935 |
| 2,123,599 | Fikentscher et al. | July 12, 1938 |
| 2,173,005 | Strain | Sept. 12, 1939 |
| 2,798,058 | Barber et al. | July 2, 1957 |

OTHER REFERENCES

Schildknecht: "Vinyl and Related Polymers," published by John Wiley and Sons, New York, 1952, page 321.